Figure 1:
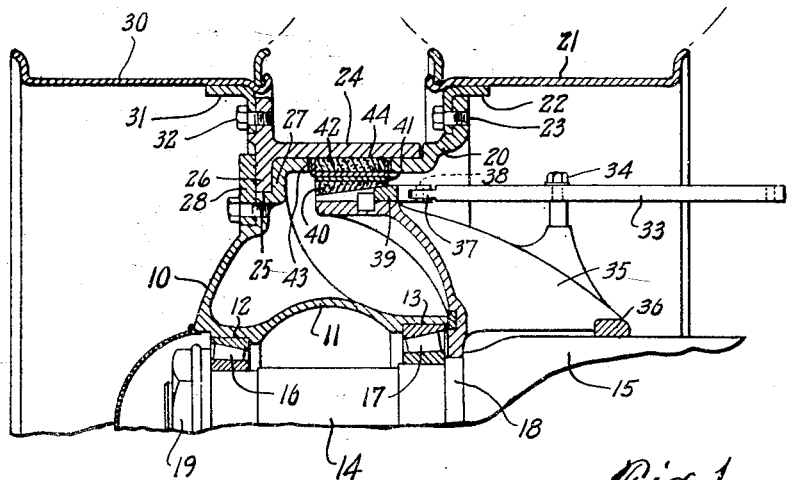

Feb. 16, 1943.   C. S. ASH   2,310,921

DUAL WHEEL VEHICLE

Original Filed Jan. 24, 1939

INVENTOR:
C. S. Ash
BY Morgan, Finnegan and Durham
ATTORNEYS.

UNITED STATES PATENT OFFICE 2,310,921

DUAL WHEEL VEHICLE

Charles S. Ash, Milford, Mich.

Original application January 24, 1939, Serial No. 252,596. Divided and this application June 10, 1941, Serial No. 397,463

5 Claims. (Cl. 301—36)

The present invention relates to new and useful improvements in dual wheel vehicles and more particularly to the bearing construction for such wheels.

This is a division of my copending application Serial No. 252,596, filed January 24, 1939, for Dual wheel vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrate one embodiment of the invention, and together with the description, serve to explain the principles of the invention.

Figure 2:
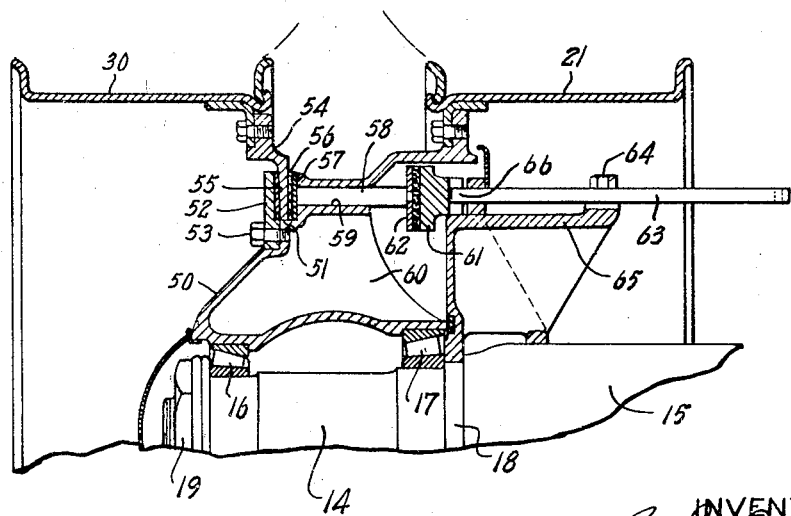

Of the drawing:

Fig. 1 is a fragmentary vertical section showing an illustrative embodiment of the bearing means of the present invention as applied to the dual wheels mounted upon a dead or trailing type axle; and Fig. 2 is a modified and illustrative embodiment of the invention, different braking means being employed.

The present invention has for its object the provision of a novel and improved dual wheel structure for use with automotive road vehicles. Another object is the provision of a simplified and more economically constructed dual wheel structure providing for the independent rotation of the dual wheels. Still another object is to provide such independently rotatable dual wheels in which the bearing structure is more compact and of simpler and more economical construction than that heretofore known. The present invention also provides a bearing structure for independently rotatable dual wheels which is easily assembled and disassembled, which may be constructed with greater tolerances than other types of bearings with the same efficiency of operation, and which will accommodate the installation of improved brakes for the wheels.

In accordance with the illustrative embodiment of the present invention there are provided two wheels, mounted in side-by-side relation for coaxial independent rotation so that each of the wheels may roll freely over the surface of the road without dragging or otherwise subjecting the tires to excessive wear. One of the wheels is mounted for rotation upon the axle end of the vehicle, and the second wheel is mounted for independent rotation upon the first by means of a journal having nearly the same diameter as the wheels. The bearing between the two wheels preferably comprises a bearing flange near the periphery of the first wheel on which is seated a bearing ring of similar diameter carried by and fixed to the second wheel. Braking means may be provided for simultaneously applying a braking force to both the inner and outer wheels so that the vehicle may be stopped by the friction between both wheels and the road.

It will be understood that the foregoing general description and the following detailed description as well are exemplary and explanatory of the invention but are not restrictive thereof.

Referring now in detail to the illustrative embodiment of the present invention as shown in Fig. 1 of the accompanying drawing, an inner wheel 10 provided with a hub 11 having spaced apart bearing seats 12 and 13 is mounted for rotation upon the reduced end 14 of a dead or trailer type axle shaft 15 by means of tapered roller bearings 16 and 17 which are held in place by means of shoulder 18 and nut 19. Wheel 10 extends cylindrically inwardly to form a flange 20 onto which the inner tire rim 21 is fastened by means of lugs 22 formed integral therewith through which extend the bolts 23 to be threaded into the flange 20.

The outer wheel 24 is mounted for independent relative rotation upon wheel 10, and in the present embodiment the inner wheel 10 is provided near its periphery with the finished bearing surface 25 on which is journalled the annular flange bearing portion 26 of the outer wheel 24. Outer wheel 24 is held against axial movement by thrust bearings mounted on the inner wheel, and these bearings are the outwardly extending portion 27 of the inner wheel 10 and the annular ring 28 bolted to the outer surface thereof, between which the bearing portion 26 is journalled. The outer tire and rim 30 are supported on wheel 24 by means of lug 31, through which extends the bolt 32 threaded into the outer wheel 24.

It will be apparent that a bearing is thus formed between the inner wheel 10 and the outer wheel 24 having a diameter nearly equal to that of the wheels, and in which the bearing surface is relatively large although it has an exceptionally small lateral measurement. It will likewise be apparent that axial forces exerted upon the periphery of wheel 24 will produce less strain upon the bearings 25, 26, 27, 28 than is the case with bearings of the usual type of small diameter positioned adjacent the axle end 14. Relatively greater tolerances may therefore be allowed in the construction of the bearing of the present invention without impairing the stability of the wheel 24 to axial thrust.

The mechanism for simultaneously braking the wheels 10 and 24 is fully shown and described in my copending application Serial No. 252,596, filed January 24, 1939, and as shown in Fig. 1 comprises the brake lever 33 which is pivoted at 34 on the brake anchor 35 and fixed as by welding 36 to the axle shaft 15. The end 37 of the lever 33 engages the pin 38 extending radially from the axially movable beveled ring 39, said ring being mounted for limited rotation upon brake anchor 35. Rotation of ring 39 by lever 33 forces said ring into engagement with the beveled lining 40 fixed to the inner periphery of the expansible brake band 41, and as said brake band expands the spaced apart lengths of brake lining 42, which are fixed to its outer periphery and extend through correspondingly spaced apart apertures 43 in the inner wheel 10, engage the axially extending cylindrical brake drum 44 of the outer wheel 24.

Fig. 2 shows a modification of the present invention in which the inner wheel also supports the outer wheel by means of bearing surfaces nearly the same diameter as the wheels. As embodied the inner wheel 50 is formed with a finished bearing surface 51 of annular form and a retaining ring 52 secured by screws 53. The outer wheel 54 includes an inwardly projecting annular bearing ring 55 which fits into and rides on bearing 51. The attachment of the tire rims 21 and 30 to their respective wheels 50 and 54, and the mounting of the inner wheel 50 for rotation about the axle end 14, are similar to that already described for the embodiment shown in Fig. 1.

The inner surface of ring 52 is faced with brake lining to contact with the outer face of bearing ring 55, while the inner face may be engaged by brake lining 56 mounted upon the annular ring 57. Ring 57 is axially moved by slidable rods 58 extending through and guided by apertures 59 in the rib 60 of the inner wheel 50, and these rods are, in turn, moved by pressure of the brake shoe 61 against the brake lining faced on annular ring 62 to which the inner ends of rods 58 are fast. The brakes are applied by means of lever 63 pivoted at 64 on brake support 65 and its end 66 engages a notch in the cam faced shoe 61, so that limited rotational movement of the brake shoe 61 causes the braking force to be concurrently applied to both wheels in unison. This brake mechanism is shown and described in my copending application Ser. No. 252,596 filed January 24, 1939.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheel assembly including in combination a pair of dual wheels in side-by-side coaxial relation, means for rotatably mounting one of the wheels and a bearing adjacent the periphery of and of nearly the same diameter as said rotatably mounted wheel for independently rotatably mounting the other wheel on the first.

2. A dual wheel assembly including in combination a pair of dual wheels in coaxial, side-by-side relation, a bearing flange extending inwardly from one wheel, a journal adjacent the periphery of and of nearly the same diameter as a second wheel, on which said bearing flange is mounted for free independent rotation of the two wheels, and anti-thrust members supported by the second wheel one on either side of said journal, one of said members being removable from said second wheel.

3. A dual wheel assembly including in combination a pair of dual wheels in coaxial, side-by-side relation, a bearing flange extending inwardly from one wheel, a journal adjacent the periphery of and of nearly the same diameter as the second wheel, on which said bearing flange is mounted for free independent rotation of the two wheels, and anti-thrust members supported by the second wheel one on either side of said journal, one of said anti-thrust members being axially movable into contact with said bearing flange.

4. A dual wheel assembly including in combination a pair of dual wheels in coaxial, side-by-side relation, one of said wheels having a narrow portion projecting radially inwardly from its periphery and forming an annular flange of nearly the same diameter as the wheel, a groove-like journal on the other wheel in which the flange is seated, said journal providing radial and thrust bearings for relative rotation of the wheels.

5. A dual wheel assembly including in combination a pair of dual wheels in coaxial, side-by-side relation, a bearing supported by one of said wheels adjacent its periphery of nearly the same diameter as the wheel on which it is mounted, cooperating bearing surfaces carried by the other wheel for independent rotation of the wheels, said bearing surfaces providing radial and thrust bearings for the wheels.

CHARLES S. ASH.